(12) United States Patent
Robb et al.

(10) Patent No.: US 7,400,451 B2
(45) Date of Patent: Jul. 15, 2008

(54) LENTICULAR LENS SHEET REGISTRATION AND ALIGNMENT DEVICE

(75) Inventors: Jeffrey Robb, Richmond (GB); Olivier Pitavy, Richmond (GB)

(73) Assignee: Facestation Limited, Surrey (GB)

( * ) Notice: Subject to any disclaimer, the term of this patent is extended or adjusted under 35 U.S.C. 154(b) by 0 days.

(21) Appl. No.: 11/352,442

(22) Filed: Feb. 10, 2006

(65) Prior Publication Data

US 2007/0188874 A1    Aug. 16, 2007

(51) Int. Cl.
*G02B 27/10* (2006.01)
*B41J 2/01* (2006.01)
(52) U.S. Cl. .......................... 359/619; 347/1
(58) Field of Classification Search ......... 359/618–622; 347/1
See application file for complete search history.

(56) References Cited

U.S. PATENT DOCUMENTS

| | | | | |
|---|---|---|---|---|
| 6,133,928 A | * | 10/2000 | Kayashima et al. | 347/171 |
| 6,460,993 B2 | * | 10/2002 | Pilu | 347/107 |
| 6,615,150 B1 | * | 9/2003 | Nelson et al. | 702/85 |
| 6,625,864 B2 | * | 9/2003 | Nemoto et al. | 359/621 |
| 2002/0196368 A1 | * | 12/2002 | Peterson | 348/584 |

* cited by examiner

*Primary Examiner*—Alicia M Harrington
(74) *Attorney, Agent, or Firm*—Schwartz Cooper Chartered

(57) ABSTRACT

A lenticular lens sheet registration and alignment device uses an elongate blade accurately to align a lenticular sheet for printing purposes. The blade nestles within one of the elongate recesses of the sheet. The device may be used in association with a printer, for example a flat-bed printer.

6 Claims, 3 Drawing Sheets

LENTICULAR LENS SHEET REGISTRATION AND ALIGNMENT DEVICE

DESCRIPTION

CROSS REFERENCE TO RELATED APPLICATIONS

None.

TECHNICAL FIELD

The present invention relates to a device for the registration and alignment of a lenticular lens sheet; and in particular although not exclusively to a registration and alignment device for registering and aligning a lenticular lens sheet with a printer for printing a composite interlaced image directly on to a lower surface of the lenticular lens sheet.

BACKGROUND OF THE INVENTION

Lenticular photography systems typically make use of a lenticular lens sheet which is an array of identical elongate lenticular lenses, or lenticules, usually elongate convex lenses on an upper display surface of the sheet. The sheet normally has a planar lower surface. A lenticular photograph, for example a lenticular representation of a stereoscopic image (eg a three dimensional image or an animation) is formed when a suitably-produced composite interlaced image is printed or secured to the lower surface so as to be viewable through the sheet. The composite comprises elongate strips of images which are appropriately interlaced and dimensioned so as to be aligned with the overlying lenses. The specific characteristics of the lenticular photograph/product are determined by the particular dimensions, shape and design of the convex lenses and the composite interlaced image.

A typical lenticular lens sheet 100, as well known in the art, is shown in a cross sectional view in FIG. 1. The sheet 100 is manufactured from a transparent medium 110 which has a planar lower surface 140 and an upper surface comprising a longitudinal array of elongate protrusions 120 and recesses 130. The elongate protrusions 120 and recesses 130 form lenticular lenses on the upper surface of the sheet.

A lenticular product/photograph includes a composite interlaced image (not shown) located beneath the lenticular lens sheet. The composite interlaced image, comprising elongate strips of images, is suitably aligned with the lenticular lens sheet. Typically, the composite image is printed directly onto the lower planar surface 140 of the transparent medium.

Each strip is viewable through the lenticular lens sheet only at certain viewing angles. The dimensions of the lenticular lenses and the separation distance between the lenticular lens sheet and the composite interlaced image determine the appropriate viewing angle of each strip of the interlaced image.

The elongate strips are suitably dimensioned, aligned with the lenses and interlaced such that the specific elongate strips viewable by the view from a certain viewing angle form an image. The lenticular product is typically designed such that a different image is observed at different viewing angles.

An appropriately-composed interlaced image located under a suitably constructed lenticular lens sheet enables a viewer to perceive various effects such as binocular disparity, whereby each of the viewer's eyes, having different viewing angles to the sheet, sees a different elongate stripe. Binocular disparity is an effect that is used in lenticular products for displaying images which are perceived by a viewer as three dimensional images. Alternatively, the interlaced strips of image and lenticular lens sheet can be arranged so that a viewer, when viewing the sheet from a certain angle, sees the same set of strips from each eye, the viewable strips forming an image. When the viewer views the lens from a different angle, a different set of strips is seen, forming a different perceived image. Thus the image which is perceived by the viewer changes in dependence upon the viewer's viewing angle. Such an effect may be used for displaying short animations.

In order that the desired imaging effect is properly perceived by the viewer, it is necessary for the composite interlaced image to be accurately aligned with the lenticular lens sheet with the elongate image strips parallel to the longitudinally arranged array of elongate protrusions and recess.

Lenticular printing to produce animated or three dimensional effects as a mass-production technique started in the 1940s. The most common method, which accounts for the vast majority of lenticular images in the world today, is lithographic printing directly onto a lenticular lens sheet. However, in order to print directly onto the sheet, it is necessary to register and align the sheet very precisely with the printer.

Accordingly, a significant problem with the manufacture of lenticular products, such as lenticular photographs, is the registration and alignment of the composite interlaced image with respect to the lenticular lens sheet. When the composite interlaced image is to be directly printed onto the lower surface of the lenticular lens sheet, it is necessary to register and align the lenticular lens sheet with respect to the printing head.

There have been a variety of previous attempts to produce registration and alignment systems to register the precise location of the lenticular lenses and to align them with a composite interlaced image. Such systems have been designed to account for inaccuracies inherent in the manufacture of lenticular lens sheets and, in particular, inaccuracies resulting from embossing using an engraved cylinder. Alignment of the lens is especially important where the composite interlaced image is printed directly on to the lenticular lens screen. Misalignment and non-suitable registration leads to ineffectual lenticular products and expensive wastage of materials and production costs.

Most registration devices are complex systems which rely on the optical properties of the lenticular lens sheet itself. Usually such devices employ a light emitter and detector system to measure changes in contrast and focusing properties of the lenticular lens sheet.

The system according to embodiments of the present invention seeks to alleviate the problems associated with the prior art and provide a simple and inexpensive registration and alignment device for lenticular lens sheets.

SUMMARY OF THE INVENTION

According to a first aspect of the present invention there is provided a registration and alignment device for lenticular lens sheets comprising:
  a substrate;
  an aligner located on an upper surface of the substrate projecting outwardly of the surface and arranged to be lodged in an elongate recess in a surface of a lenticular lens sheet when supported by the substrate.

According to a second aspect of the present invention there is provided a printer including a registration and alignment device for lenticular lens sheets the device comprising:
  a substrate,
  an aligner located on an upper surface of the substrate projecting outwardly of the surface and arranged to be lodged in an elongate recess in a surface of a lenticular lens sheet when supported by the substrate.

According to a third aspect of the present invention there is provided an integrated system for image capture, image processing and image printing for the creation of an individual lenticular photograph of a subject, the system comprising:

(1) an imager arranged to acquire multiple images of the subject, an image processor for creating a composite interlaced image of said multiple images;

(2) a printer for printing said composite interlaced image onto a lenticular lens sheet, the printer including a registration and alignment device for lenticular lens sheets, the device comprising:

(a) a substrate; and (b) an aligner located on an upper surface of the substrate projecting outwardly of the surface and arranged to be lodged in an elongate recess in a surface of a lenticular lens sheet when supported by the substrate.

Embodiments according to the present invention provide a cheap and simple system for the registration and alignment of a lenticular lens sheet. A registration blade defines a first axis parallel to the longitudinally arranged array of elongate protrusions and recesses. A second axis is defined perpendicular to the first axis and parallel to a planar surface of the lenticular lens sheet. Using the two perpendicular axes, a co-ordinate system can be set up which enables the precise definition, for example in xy co-ordinates, of a position of a point on the lenticular lens sheet relative to the registration blade. The location of the registration blade can be measured with respect to a desired reference point, for example a registration frame or a flat bed of a printer, such that a position on the lenticular lens sheet can be calculated relative to the desired point of reference, thus suitably registering the lenticular lens sheet.

The lenticular screen may be injection moulded in one embodiment. The use of injection moulded lenticular screens has to date only been used for small promotional items such as key fobs and CD jewel cases due to the problems associated with polymer flow into larger moulds. Through the use of fan venting, the proposed system can make use of larger size injection moulded lenticular lens sheets, large enough for commercially acceptable lenticular products such as lenticular photographs, of the order of 10"×8" or greater.

BRIEF DESCRIPTION OF THE DRAWINGS

The present invention may be carried out into practice in a number of ways; and several specific embodiments will now be described, by way of example, with reference to the accompanying drawings, in which.

DETAILED DESCRIPTION OF THE INVENTION

Figure 1A:
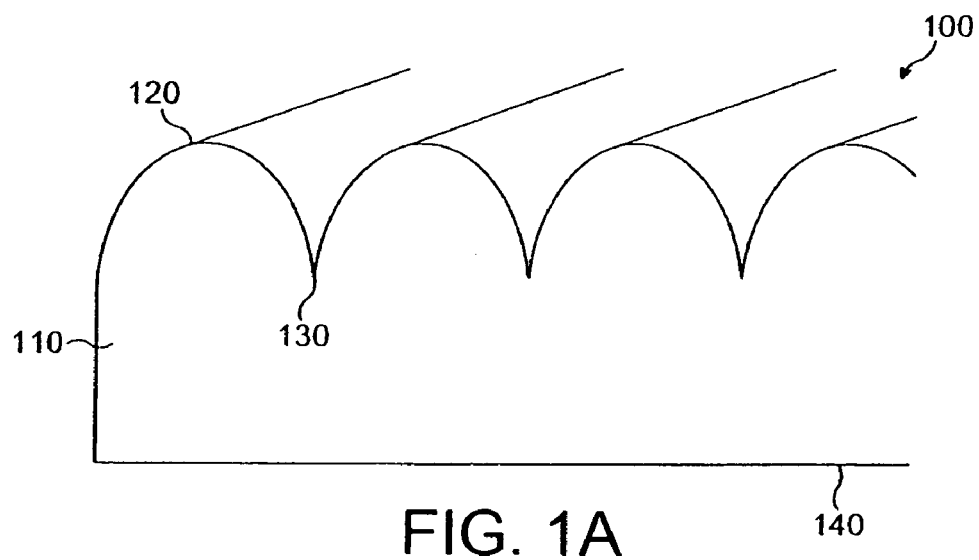
FIG. 1A shows a cross-sectional view of a lenticular lens sheet as known in the art.
Figure 1B:
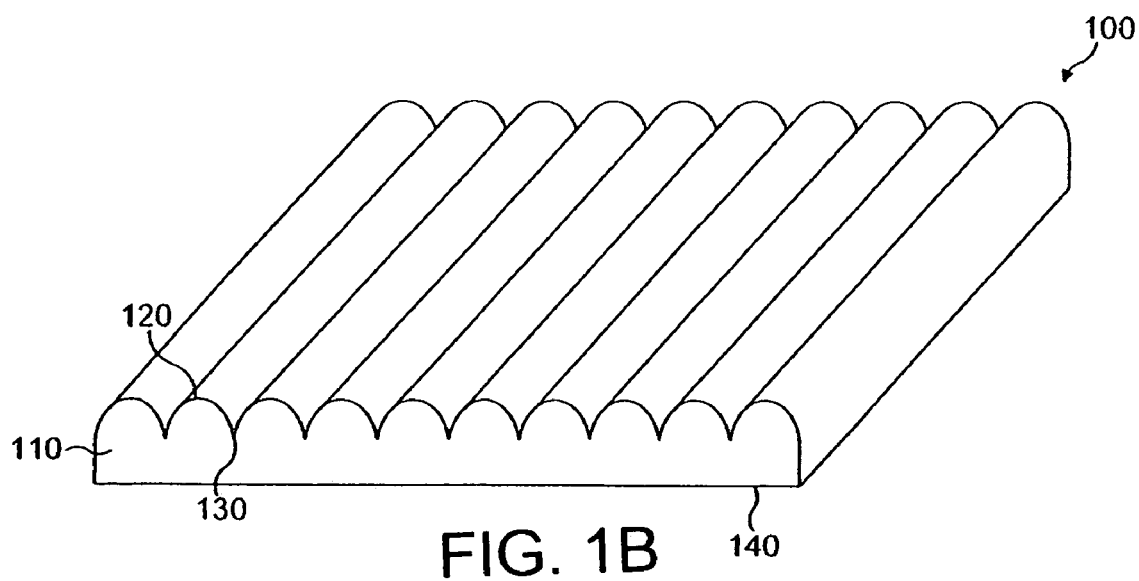
FIG. 1B shows a perspective view of a lenticular lens sheet as known in the art.
Figure 2:
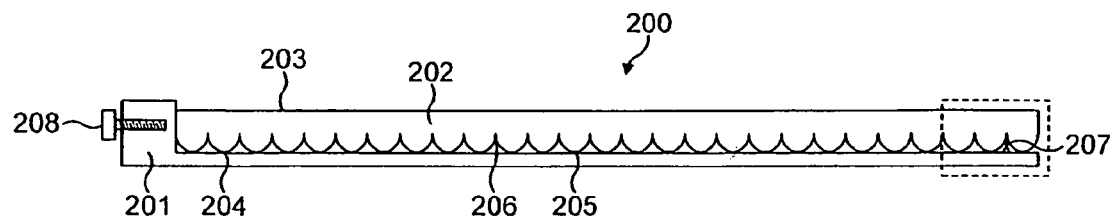
FIG. 2 shows a lenticular lens sheet registration and alignment device according to a first embodiment of the present invention.
Figure 3:
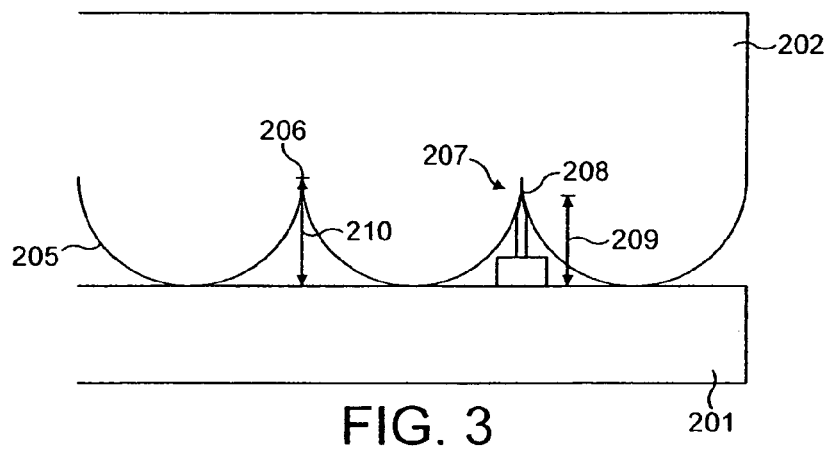
FIG. 3 shows a close-up of a section of the lenticular lens sheet registration and alignment device of FIG. 2.

FIG. 2 shows a registration and alignment device 200 for a lenticular lens sheet 202 according to a first embodiment of the present invention. The device comprises a lenticular sheet holder such as a frame 201 and a lenticular sheet aligner comprising an alignment blade 207. The alignment blade 207 is elongate and straight and is integral with or securely attached to the frame 201 with the blade 207 projecting upwardly of the frame. The frame and blade are made from a material which has a low coefficient of expansion.

A lenticular lens sheet suitable for use with the present device, has lenticules in the form of elongate recesses 206 and protrusions 205 on its upper display surface 204, and has a planar lower surface. The elongate recesses and protrusions are parallel to one another and arranged in a longitudinal array. In use, the lenticular lens sheet 202 is inverted and positioned in the frame such that the blade 207 nestles between two lenticules i.e. in an elongate recess 208 of an upper display surface of the lenticular lens sheet. The elongate blade, which is preferably made of stainless steel, is honed to a fine edge so that the edge fits precisely into a single elongate recess. Due to the smooth and continuous shape formed from a crest of a protrusion to a trough of a recess, the fine edge of the blade when parallel to the protrusions and recesses and abutted to the upper surface of the lenticular lens sheet will, under the force of gravity, naturally be disposed to nestle into the nadir of a recess 208. Thus this simple arrangement is capable of providing extremely accurate auto-aligning of the lenticular lens sheet with the alignment blade.

Since the elongate recesses 206 and protrusions 205 are parallel to one another and longitudinally arranged, the elongate straight blade when firmly nestled into a recess 208 is parallel to all the recesses 206 and protrusions 205. The lenticular lens sheet 202 is thereby aligned, registered and secured with respect to the blade 207 which defines a first axis, e.g. an x-axis.

The lower planar surface 203 of the lenticular lens sheet, on to which a composite interlaced image is to be applied, faces upwards in the frame 201- and is exposed so that it is readily accessible for application of the composite interlaced image. Once a position of the lenticular lens sheet 202 is found to produce a satisfactory result, for example the sheet is suitably aligned for printing of a composite interlaced image on the lower surface 203 of the lenticular lens sheet 202, the lenticular lens sheet will remain in register until a parameter is altered, such as the pitch of the recesses and protrusions on the lenticular lens sheet.

The height 209 of the blade may be adjustable so that it can be of equal or lesser height to the distance 210 between a trough of a recess and the crest of a protrusion or a level of the display upper surface 204. The horizontal position of the frame 201 and integrated blade with respect to affixed printer (see FIG. 5) may be adjusted by means of a screw 208.

As each protrusion 205 and recess-206 is self-similar with regards to their pitch and amplitude, the registration and alignment device 200 does not have to account for variation in dimensions of the lenticular lens sheet material once set, i.e. the length, width and thickness of the sheet.

Figure 4:
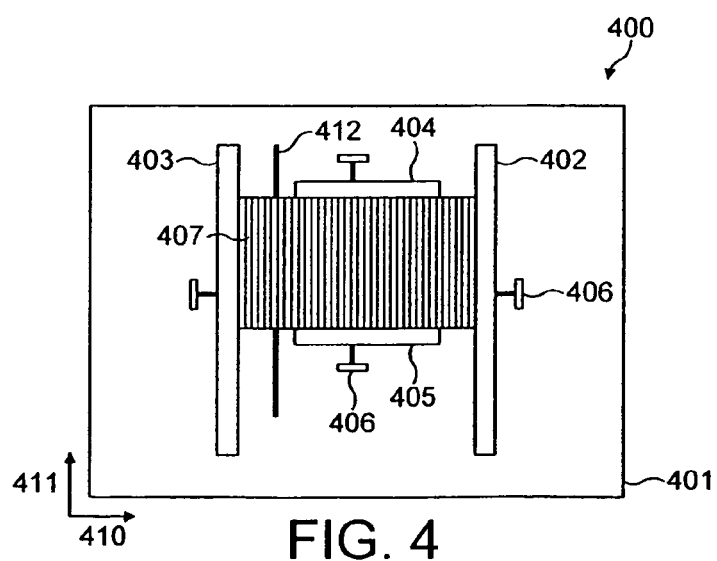
FIG. 4 shows a plan view of a registration and alignment device according to a second embodiment of the present invention.

FIG. 4 shows a lenticular lens sheet registration and alignment device according to a second embodiment. A registration frame 400 comprises four abutment edges 402, 403, 404, 405 each of which are moveably mounted on a lower substrate 407. Each abutment edge is adjustable, for example by threaded screws 406, to securely hold a lenticular lens sheet 407 and lock it into position once the sheet has been nestled onto a registration blade 412. This gives adjustment in an x- and y-axis as shown by arrows 410 and 411. Registration frames can be interchangeable to allow for different orientations and different sizes of the lenticular lens sheet 407.

Figure 5:
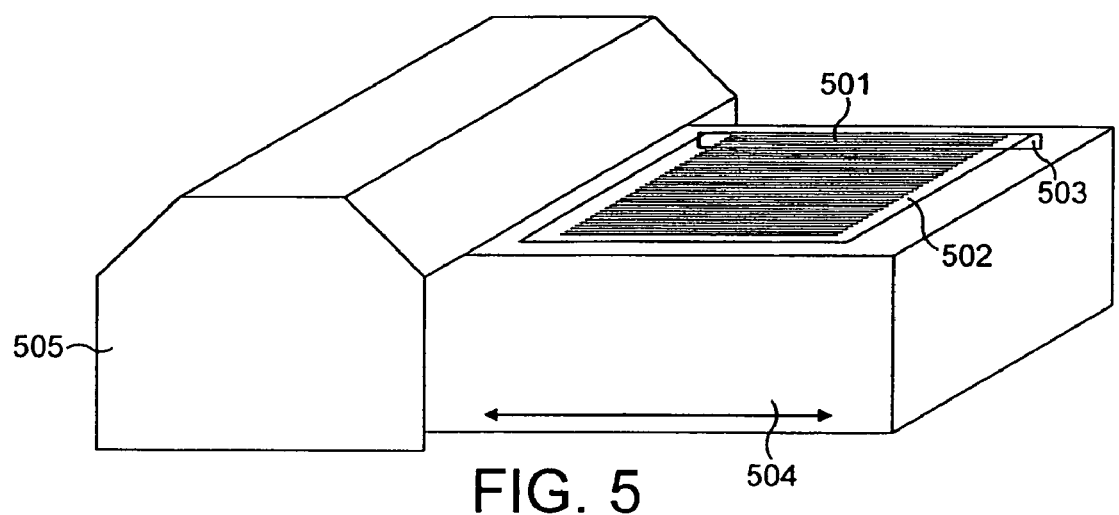
FIG. 5 shows an example of a registration and alignment device used in conjunction with a printer.

Preferably, embodiments of the lenticular lens sheet registration and alignment device are used for lenticular printing. A high resolution printer, preferably an inkjet printer modified to a flatbed design, is used which incorporates a stationary printer head and moving base; the base including a registration and alignment device as described above. The thickness of the lenticular lens sheet can be compensated for by varying the height of the moving flatbed with respect to the printing head. Preferably, the registration and alignment device can be modified to take any type of lenticular lens sheet, including those produced by conventional cylinder extrusion, up to any size the flatbed printer will allow. Very large flatbed printers could also use the registration and alignment device. For large format printing, the registration blade may be accurately milled from a solid block to ensure its straightness As shown in FIG. 5, a lenticular lens sheet 501 is securely held in place by the lenticular lens sheet registration and alignment device 502 and aligned with a registration blade 503. The lenticular lens sheet registration and alignment device 502 securely holds the registered lenticular lens sheet 501 and is located on a moveable base or flatbed 504 of an inkjet printer 505 or a lithographic printer. The print head is stationary and the flatbed 504 moves under the print head during the printing process of printing a composite interlaced image onto the exposed planar lower surface of the lenticular lens sheet The lenticular lens sheet 501 is inverted when placed on the registration and alignment device 502 so that the blade 503 lodges in a recess of the display surface of the lenticular lens sheet 502 and a lower surface of the sheet is exposed to the printing head for printing directly on to the lower surface. Thus, the registration and alignment device according to embodiments of the present invention enables registration of the lenticules of the lens sheet and accurate printing directly on to the sheet.

Preferably, the lenticular lens sheet is formed in an injection moulding process. The major benefit of injection moulding is a high product consistency. Additionally, an injection moulded lens can be manufactured to any thickness from the same mould which, in the case of lenticular photography, enables the optimum viewing distance to be varied from the same mould.

The injection moulding process can also use plastics which may be suitable for conventional production methods, such as embossing and extrusion. Injection moulded lenses can be designed to contain promotional graphics such as company logos within its structure for advertising purposes Or to prevent unauthorised duplication. Additionally, a precise plastic composition can be manufactured such that only certain inks will adhere to the surface and, most importantly, will dry quickly.

Figure 6:
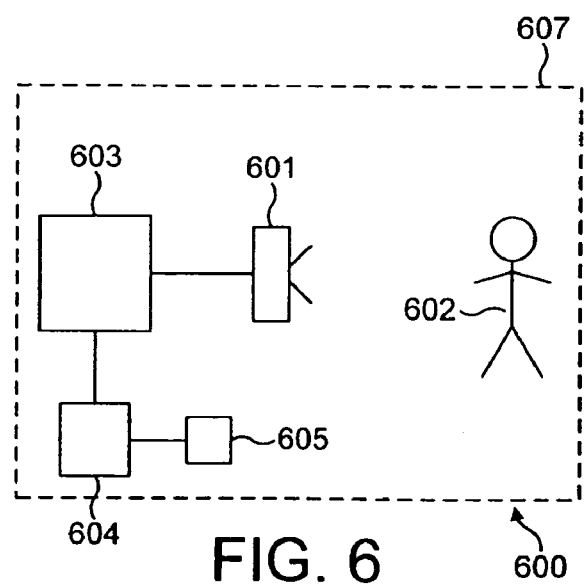
FIG. 6 shows an integrated lenticular lens product generation system suitable for use with embodiments of a registration and alignment device according to the present invention.

Ideally, the lenticular lens registration and alignment device is incorporated into an integrated lenticular imaging processing and printing system for producing 'on-the-fly', or in a semi-instant process, lenticular products such as three dimensional lenticular photographs and animations. As shown in FIG. 6, the system 600 comprises an imager 601, such as a digital camera which obtains a plurality of images of a subject 602. If a three dimensional representation of the subject is desired a plurality of imagers may be suitably arranged around the subject or the imager is capable of being moved around the subject in order to capture the subject from the necessary angles to produce a stereoscopic image.

Alternatively, if an animated representation of the subject is desired, the imager can capture several images of the subject in quick succession.

A processor 603 interlaces the images from the imager into a single composite interlaced image. The interlaced image is sent to a printer 604, preferably an inkjet printer in a flatbed design with a stationary head and a moving base, which prints on to a lower surface of a lenticular lens sheet, preferably made by injection moulding. The lenticular lens sheet is held in an aligned and registered position on the moving base of the printer by a lenticular lens sheet registration and alignment device 605 as described above.

Additionally, the housing 607 is provided so that the system is self-contained and housed in a kiosk or booth-like unit allowing the system to be portable.

The invention claimed:

1. A printer for printing onto a lenticular lens sheet having a plurality of parallel lenticules defining parallel elongate recesses therebetween, the printer having a printer head and a registration and alignment device comprising:
   a substrate; and
   a straight elongate tapered blade on an upper surface of the substrate, said blade being arranged to nestle into one of said elongate recesses in a lenticular lens sheet supported by the substrate, thereby registering and aligning said sheet with respect to said printer head.

2. A printer as claimed in claim 1 in which the blade is integral with the substrate.

3. A printer as claimed in claim 1 including an adjuster for adjusting the registration of the substrate with respect to the print head.

4. A printer as claimed in claim 1 in which the substrate is moveable with respect to the print head which remains stationary.

5. A printer as claimed in claim 1 including a plurality of replaceable substrates and blades for lens sheets of differing sizes.

6. An integrated system for image capture, image processing and image printing for the creation of an individual lenticular photograph of a subject, the system comprising:
   (1) an imager arranged to acquire multiple images of the subject, an image processor for creating a composite interlaced image of said multiple images;
   (2) a printer for printing said composite interlaced image onto a lenticular sheet having a plurality of parallel lenticules defining parallel elongate recesses therebetween, the printer having a printer head and a registration and alignment device comprising:
   a substrate; and
   a straight elongate tapered blade on an upper surface of the substrate, said blade being arranged to nestle into one of said elongate recesses in a lenticular lens sheet supported by the substrate, thereby registering and aligning said sheet with respect to said printer head.

* * * * *